United States Patent
Nakasu et al.

(10) Patent No.: US 6,301,472 B1
(45) Date of Patent: *Oct. 9, 2001

(54) PORTABLE TELEPHONE SYSTEM

(75) Inventors: Jiro Nakasu; Hideki Hayashi; Tomoaki Tsukada; Kunio Kodaka; Yasushi Onooka; Kazuhiro Yamamoto; Shunji Yamanaka, all of Tokyo; Yuji Mitani, Kanagawa, all of (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/194,677
(22) PCT Filed: Jun. 17, 1997
(86) PCT No.: PCT/JP97/02086
  § 371 Date: Dec. 1, 1998
  § 102(e) Date: Dec. 1, 1998
(87) PCT Pub. No.: WO97/49232
  PCT Pub. Date: Dec. 24, 1997

(30) Foreign Application Priority Data

Jun. 18, 1996 (JP) .................................................. 8-157127
Mar. 4, 1997 (JP) .................................................. 9-049436

(51) Int. Cl.[7] ............................. H04Q 7/20; H04M 15/18
(52) U.S. Cl. ..................... 455/405; 455/406; 455/407; 455/409; 379/91.1; 379/111; 379/114
(58) Field of Search .................................. 455/405, 406, 455/4.2, 407, 409, 410, 411, 558; 379/111, 91.1, 114, 122, 144, 446, 455, 454

(56) References Cited

U.S. PATENT DOCUMENTS

| | | | | |
|---|---|---|---|---|
| 5,353,335 | * | 10/1994 | D'Urso et al. | 379/144 |
| 5,412,726 | * | 5/1995 | Nevoux et al. | 455/406 |
| 5,440,621 | * | 8/1995 | Castro | 379/144 |
| 5,592,535 | * | 1/1997 | Klotz | 379/58 |
| 5,610,979 | * | 3/1997 | Yu | 379/446 |
| 5,673,306 | * | 9/1997 | Amadon et al. | 379/144 |
| 5,703,945 | * | 12/1997 | Smith | 379/455 |
| 5,778,313 | * | 7/1998 | Fougnies | 455/406 |
| 5,812,945 | * | 9/1998 | Hansen et al. | 455/406 |
| 5,826,185 | * | 10/1998 | Wise et al. | 455/405 |
| 5,848,138 | * | 12/1998 | Sarpola et al. | 379/114 |
| 5,854,975 | * | 12/1998 | Fougnies et al. | 455/408 |
| 5,909,485 | * | 6/1999 | Martin et al. | 379/144 |

* cited by examiner

Primary Examiner—Lee Nguyen
Assistant Examiner—Simon Nguyen

(57) ABSTRACT

A switching system (3) has, in addition to an ordinary accounting function, an origination-only accounting control unit 6 to monitor the number of message units used by an origination-only portable telephone (1B) identified by a terminal identification number and to deny the origination of a call by the origination-only portable telephone (1B) upon the increase of the number of used message units to a predetermined number. The origination-only accounting control unit (6) accepts the origination of a call made by the origination-only portable telephone (1B) when a prescribed input about the origination-only portable telephone (1B) is given thereto by a system operator by operating a predetermined terminal device (7) or the like after the denial of origination of a call by the origination-only portable telephone (1B).

25 Claims, 12 Drawing Sheets

FIG.4
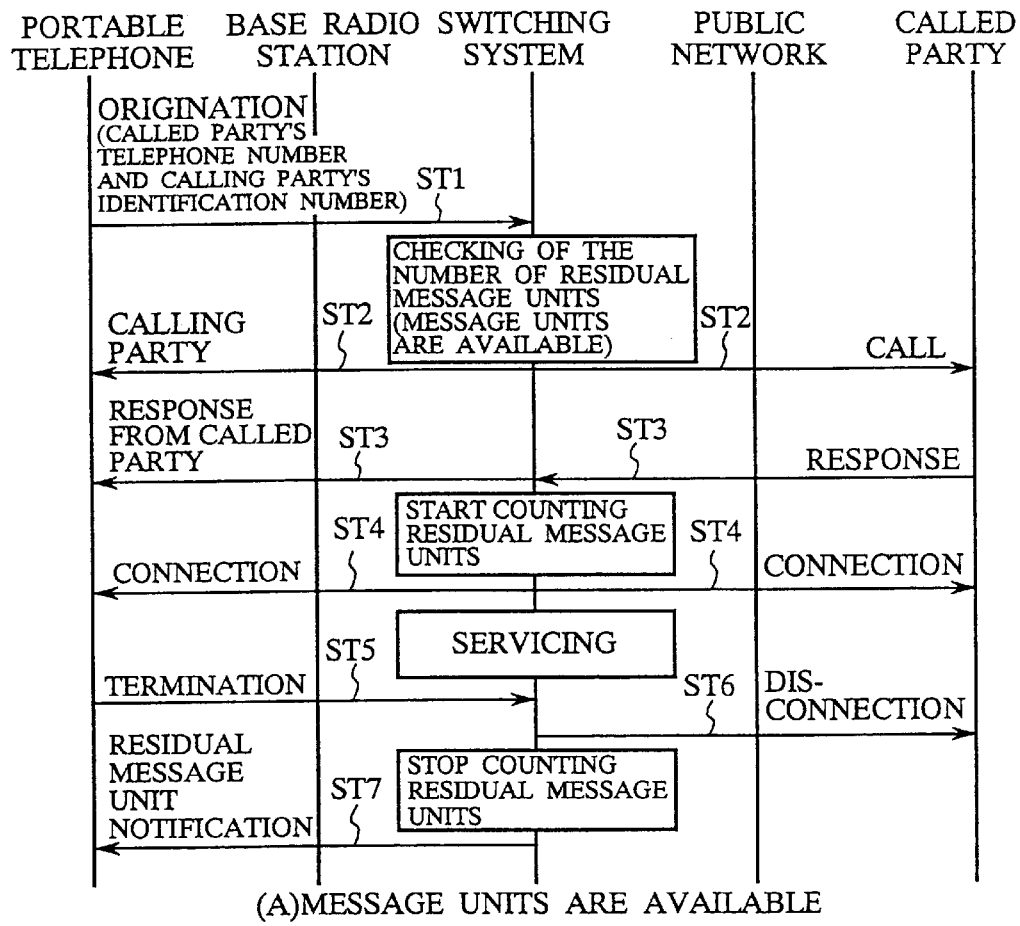
(A) MESSAGE UNITS ARE AVAILABLE
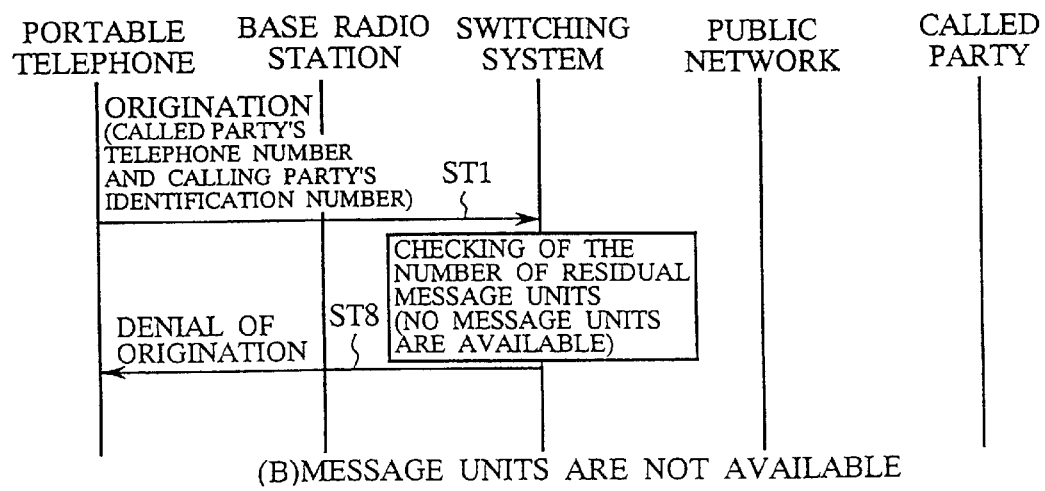
(B) MESSAGE UNITS ARE NOT AVAILABLE

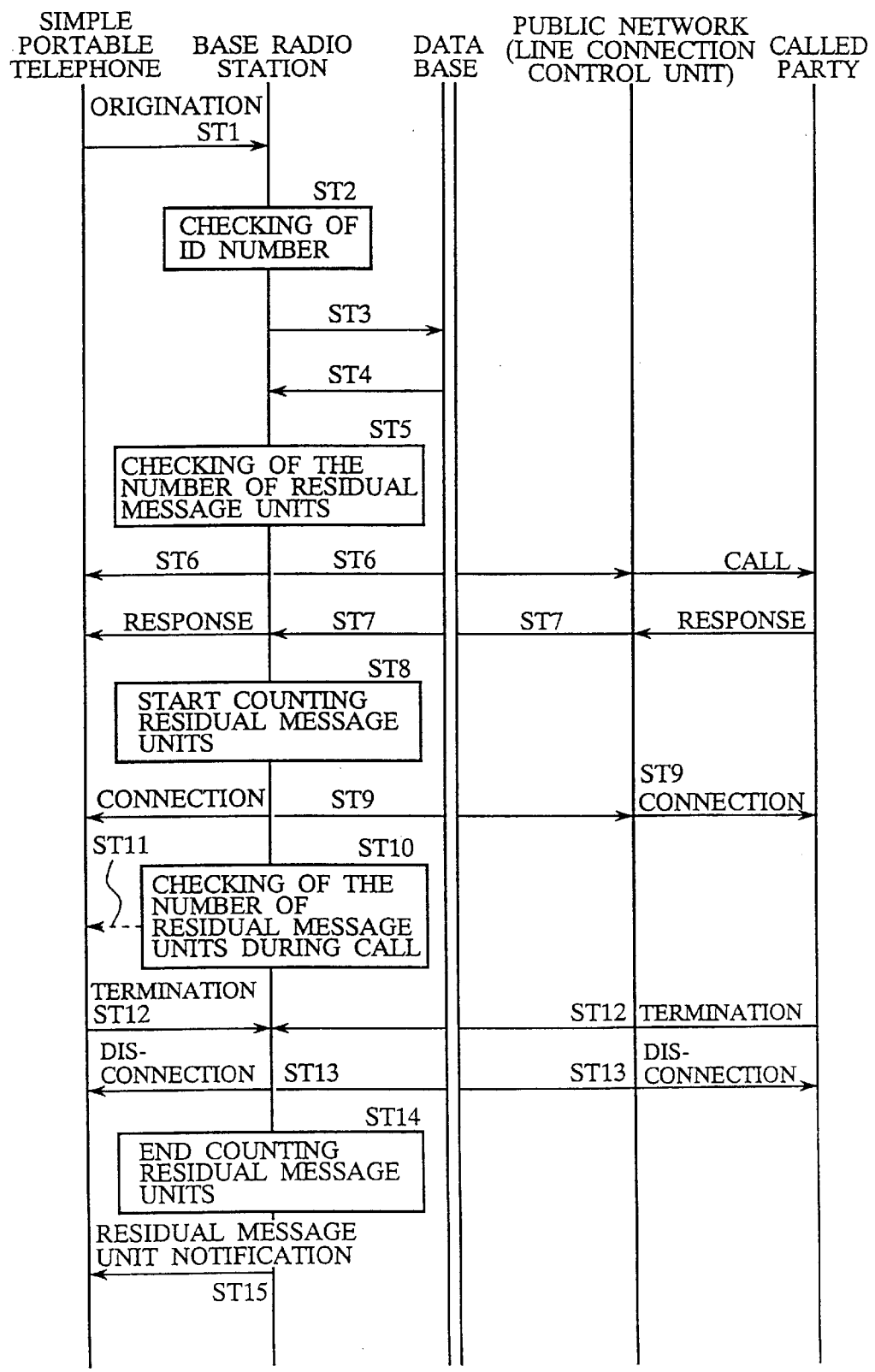

FIG. 13(a)
FIG. 13(b)
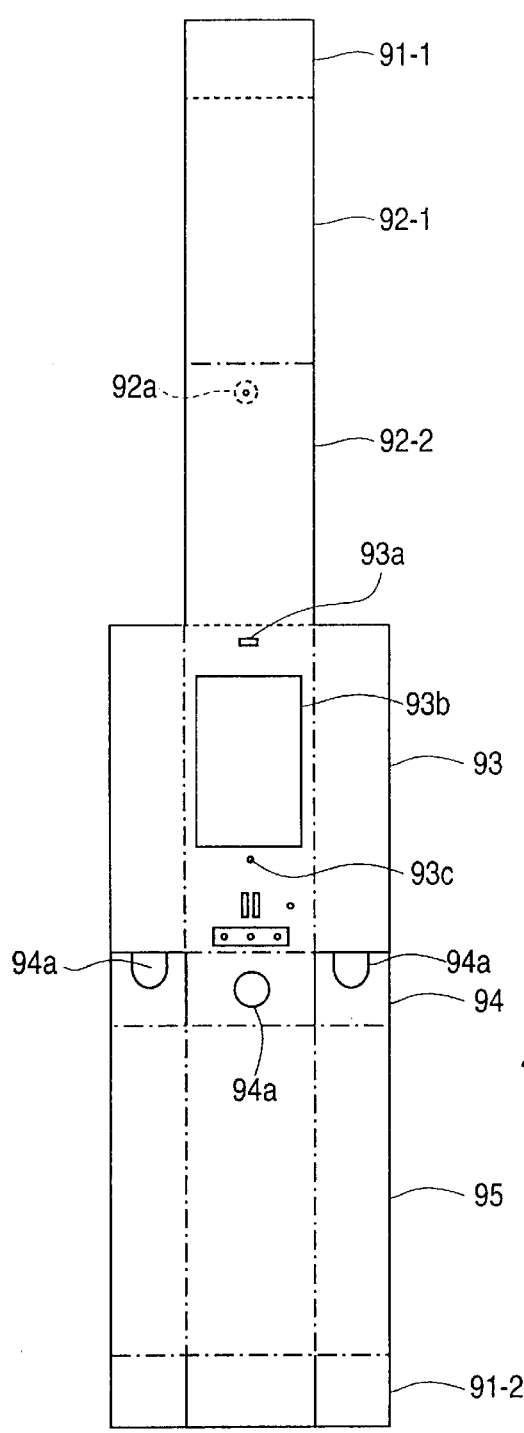
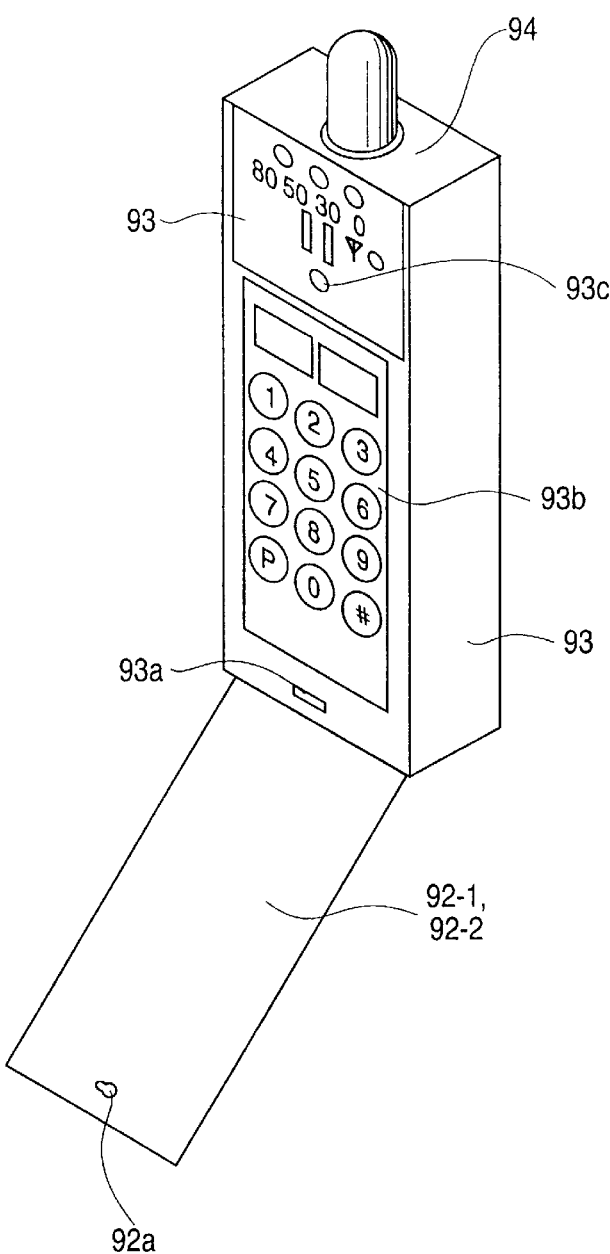

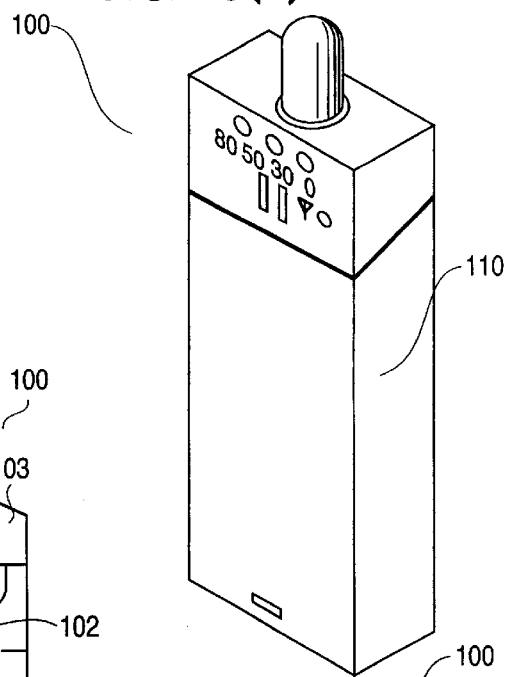
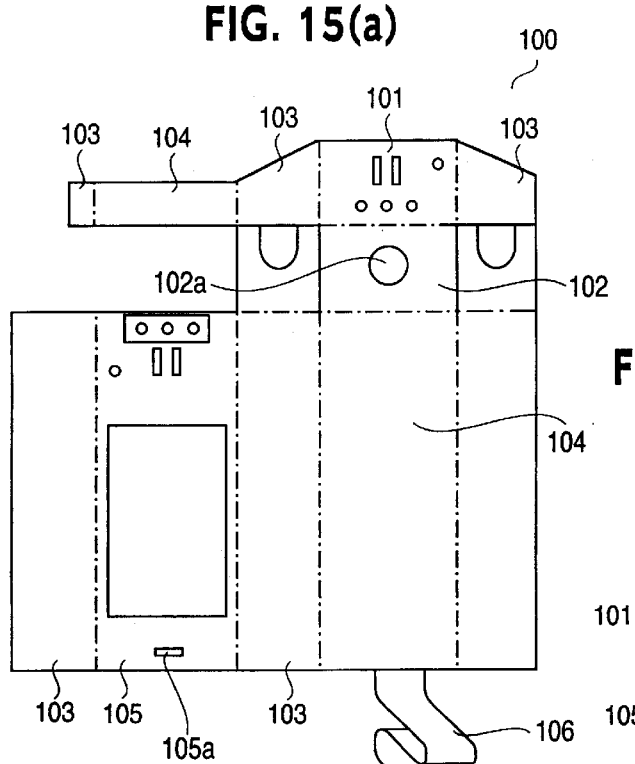
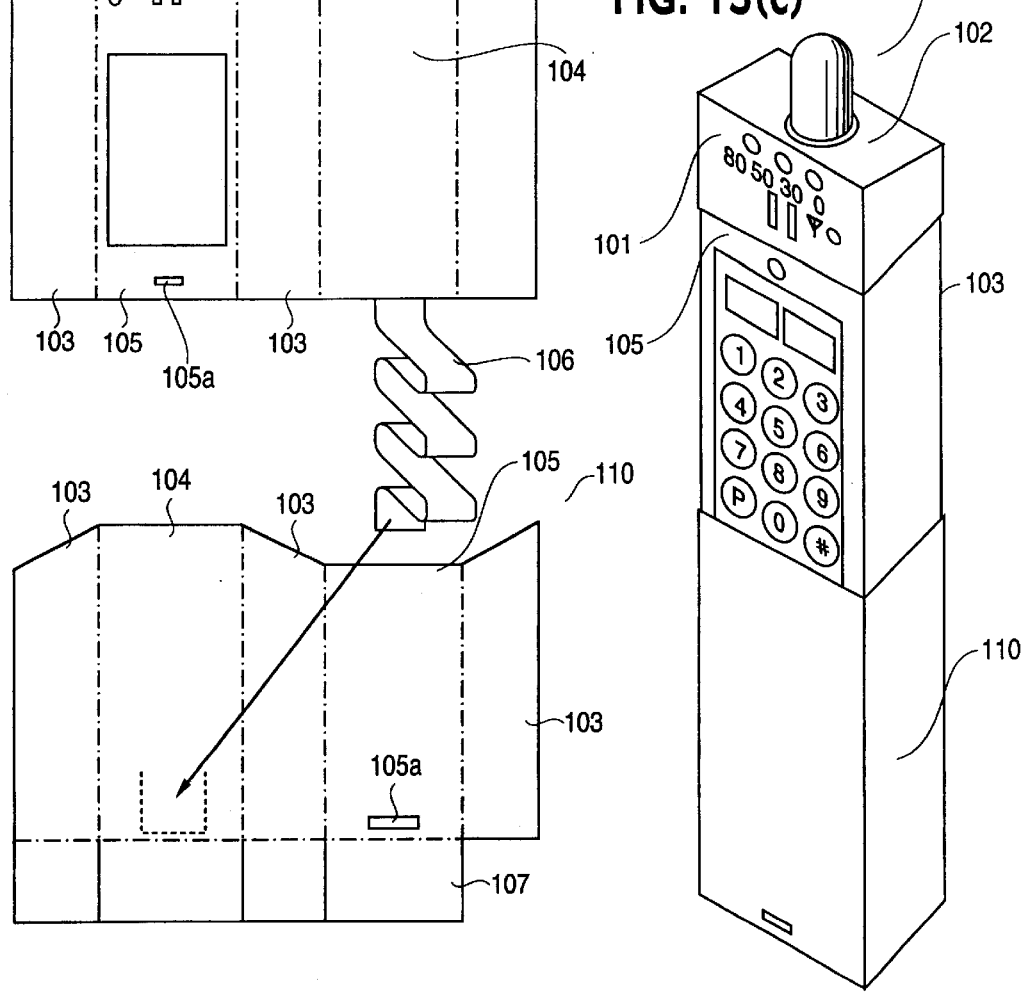

PORTABLE TELEPHONE SYSTEM

This application is the national phase under 35 U.S.C. §371 of prior PCT International Application No. PCT/JP97/02086 which has an International filing date of Jun. 17, 1997 which designated the United States of America.

TECHNICAL FIELD

The present invention relates to a portable telephone system and, more particularly, to what is called a prepaid type portable telephone system which allows a portable telephone to make a predetermined number of message units, or message units and timed receptions.

BACKGROUND ART

A prior art prepaid type portable telephone system proposed in JP-A No. 3-45031 is capable of metering message units used by a portable telephone and of stalling the portable telephone upon the detection of completion of a predetermined number of message units corresponding to a predetermined value to enable the omission of both a location registering operation and an accounting operation to be carried out by a switching system. The function of making message units correspond to a predetermined amount of money of the portable telephone is restored when the predetermined amount of money is paid.

The portable telephone for the prior art portable telephone system needs a circuitry for counting the number of message units, calculation and data storage to carry out an accounting procedure, and hence the complexity of the portable telephone is enhanced accordingly, which impedes the miniaturization and the reduction of weight of the portable telephone.

The accounting circuit of the portable telephone capable of carrying out an accounting procedure may be altered dishonestly, and it is difficult to prevent the dishonest use of the portable telephone.

The foregoing prepaid charging system cannot be applied to a simple portable telephone system. A portable telephone for a current portable telephone system is too expensive to use for the simple portable telephone system having a prepaid type charging system.

The present invention has been made to solve the foregoing problems and it is therefore an object of the present invention to provide a high-security portable telephone system allowing the use of a small, lightweight prepaid type portable telephone, and to provide a small, lightweight portable telephone for the portable telephone system.

DISCLOSURE OF THE INVENTION

In a portable telephone system according to an invention stated in claim 1, an accounting means is included in a switching system. A switching system included in the portable telephone system counts the number of message units used by each of a plurality of portable telephones including origination-only portable telephones, each of which are identified by terminal identifying information assigned thereto. The originating operation of the origination-only portable telephone is denied when the number of message units used by the origination-only portable telephone identified by the terminal identifying information reaches a predetermined number of message units. Nevertheless, the originating operation of the origination-only portable telephone which is identified by the terminal identifying information, is accepted when a predetermined input operation is executed.

Thus, the origination-only portable telephone can be formed in a small, lightweight construction, and the security of the portable telephone system can remarkably be improved.

In a portable telephone system according to an invention stated in claim 2, the power key of a power switch included in the origination-only portable telephone is operated to close the power switch every time the origination-only portable telephone is used for originating a call.

Thus, the power consumption of the origination-only portable telephone is low as compared with that of an originating-and-receiving portable telephone which is kept in a wait state, and the origination-only portable telephone for the portable telephone system can be formed in a small, lightweight construction.

In a portable telephone system according to an invention stated in claim 3, the origination-only portable telephone has a control panel and numeric keys for entering telephone number information for a call are arranged on the control panel, and the origination-only portable telephone can be connected to a power supply by operating the numeric keys.

Thus, the origination-only portable telephone need not be provided with a power key, so that the size and the weight of the origination-only portable telephone can be reduced accordingly.

In a portable telephone system according to an invention stated in claim 4, the origination-only portable telephone is disconnected from a power supply if any input operation is not made in a predetermined time after the connection of the origination-only portable telephone to the power supply or upon the detection of termination of a call.

Thus, the power consumption of the origination-only portable telephone can be reduced and the origination-only portable telephone can be formed in a small, lightweight construction.

In a portable telephone system according to an invention stated in claim 5, an origination-only accounting control means included in the switching system of the portable telephone system sends data representing the cumulative number of used message units to the origination-only portable telephone every termination of a call, and a call information display means included in the origination-only portable telephone displays data representing the cumulative number of used message units.

Thus, the origination-only portable telephone is small and lightweight as compared with a origination-only portable telephone which manages the residual number of message units, and the security of the portable telephone system can remarkably be enhanced.

In a portable telephone system according to an invention stated in claim 6, the plurality of portable telephones of the portable telephone system include originating-and-receiving portable telephones, the accounting means of the switching system counts the numbers of message units used by the origination-only portable telephones and the originating-and-receiving portable telephones identified by terminal identifying information.

Thus, a high-security portable telephone system including small, lightweight origination-only portable telephones can be constructed by adding only a origination-only accounting control means to the switching system of an ordinary portable telephone system.

In a portable telephone system according to an invention stated in claim 7, an accounting means included in a switching system counts the number of message units used by a prepaid type portable telephone identified by terminal identifying information assigned thereto, a prepaid charge control means denies a call originating operation and a call receiving operation of the prepaid type portable telephone upon the increase of the number of message units used by the prepaid type portable telephone identified by the terminal identifying information to a predetermined number, and accepts a call originating operation and a call receiving operation of the prepaid type portable telephone identified by the terminal identifying information upon the reception of the terminal identifying information and charging information.

Thus the security of the portable telephone system can be remarkably enhanced.

In a portable telephone system according to an invention stated in claim 8, an automatic accounting means reads the terminal identifying information assigned to the prepaid type portable telephone by a terminal identifying information reader, receives money reception information by a money input means, and sends money information together with the read terminal identifying information to a prepaid charge control means upon the reception of predetermined money information.

Thus, the portable telephone system is easy to use.

In a portable telephone system stated in claim 9, the automatic accounting means encrypts the terminal identifying information and the money information into corresponding codes by a predetermined encrypting procedure, and sends the codes to the prepaid charge control means.

Thus, the security of the portable telephone system is improved remarkably.

In a portable telephone system according to an invention stated in claim 10, portable telephones include simple portable telephones each having an accounting system which counts the cumulative number of used message units stored in a data base, converts the cumulative number of used message units at predetermined time intervals into a charge and charges the subscriber for the charge. Further, prepaid type simple portable telephones each having a prepaid charge system which reads the number of residual prepaid message units from the data base, subtracts the number of used message units from the number of residual prepaid message units during a call to allow the prepaid type simple portable telephone to function until the message units corresponding to the prepaid amount of money are depleted. A base radio station identifies the portable telephone which made a call as the simple portable telephone or the prepaid type simple portable telephone, and executes an accounting procedure according to an accounting method for the portable telephone which made a call.

Thus, the prepaid type portable telephone can be formed in a small, lightweight construction, and the security of the portable telephone system can be enhanced.

In a portable telephone system according to an invention stated in claim 11, a base radio station checks the number of residual message units during a call, sends alarm information to the calling party upon the decrease of the number of residual message units to predetermined number, and disconnects the line forcibly upon the depletion of all the residual message units.

Thus, the prepaid type portable telephone can be formed in a small, lightweight construction, and the security of the portable telephone system can be enhanced.

In a portable telephone system according to an invention stated in claim 12, the base radio station allows a fixed number of additional message units after the number of residual message units has decreased to zero.

Thus, the prepaid type portable telephone can be formed in a small, lightweight construction, the security of the portable telephone system can be enhanced, and the reduction of prepaid type portable telephone recovery percentage can be prevented.

In a portable telephone system according to an invention stated in claim 13, the base radio station sends information about the time of call, a called party and a residual charge to a base radio station to which the control of the portable telephone is handed over due to the movement of the location of the portable telephone.

Thus, the prepaid type portable telephone can be formed in a small, lightweight construction and the security of the portable telephone system can be enhanced.

In a portable telephone system according to an invention stated in claim 14, the prepaid type simple portable telephone is encased in a simple, folding case formed simply by folding a cardboard.

Thus, the simple portable telephone system can be formed in a small, lightweight construction and the security of the portable telephone system can be enhanced.

In a portable telephone system according to an invention stated in claim 15, the simple, folding case has a flip section to prevent an erroneous operation.

Thus, the simple portable telephone system can be formed in a small, lightweight construction and the portable telephone system prevents an erroneous operation.

In a portable telephone system according to an invention stated in claim 16, the flip section has a folded advertising portion.

Thus, the simple portable telephone system can be formed in a small, lightweight construction and the added value of the portable telephone system is increased.

In a portable telephone system according to an invention stated in claim 17, the simple, folding case has a covering portion for protecting the prepaid type simple portable telephone. The prepaid type simple portable telephone is contained in the covering portion. The prepaid type simple portable telephone is slid relative to the covering portion for an operation to make a call.

Thus, the simple portable telephone system can be formed in a small, lightweight construction and the portable telephone system prevents an erroneous operation.

BRIEF DESCRIPTION OF DRAWINGS

FIG. 4 are time charts of assistance in explaining operations for originating a call by the portable telephone in the portable telephone system of FIG. 1;

FIG. 11 is a time chart of assistance in explaining a calling procedure for calling a called party to be carried out by the portable telephone system in the fourth embodiment according to the present invention;

FIG. 13 are a development and a perspective view, respectively, of another folding simple case formed by folding a cardboard, employed in the portable telephone system in the fifth embodiment according to the present invention;

FIG. 15 are a development, a perspective view and a perspective view, respectively, of a fourth folding simple case formed by folding a cardboard, employed in the portable telephone system in the fifth embodiment according to the present invention.

BEST MODE FOR CARRYING OUT THE INVENTION

The present invention will be described in detail in terms of the description of a best mode for carrying out the present invention with reference to the accompanying drawings.

First Embodiment

Figure 1:
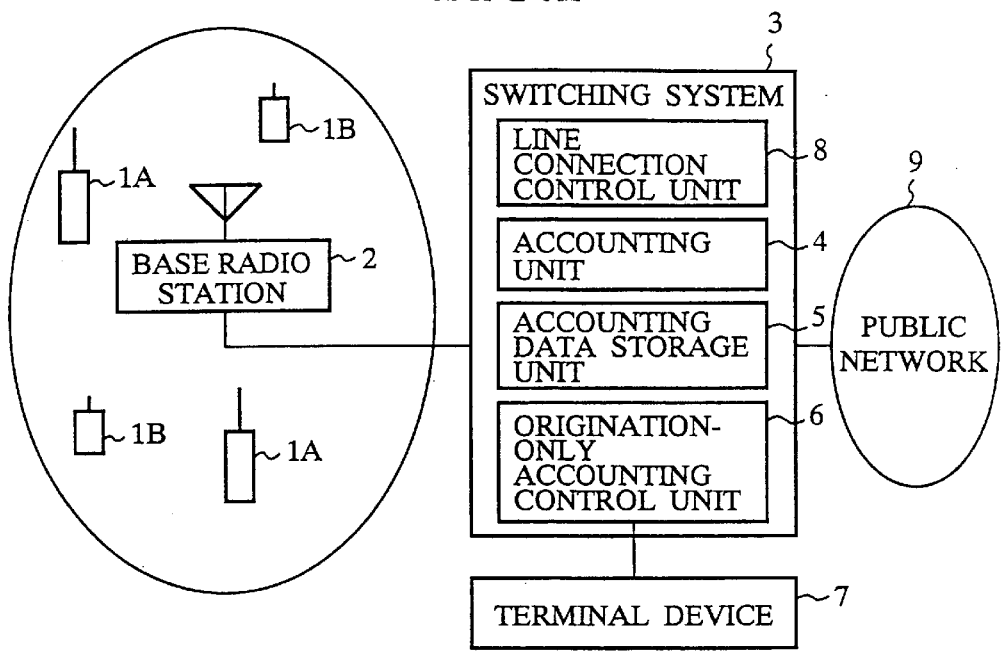
FIG. 1 is a block diagram of a portable telephone system in a first embodiment according to the present invention.

Referring to FIG. 1 showing a portable telephone system in a first embodiment according to the present invention, portable telephones 1 (1A and 1B) move around in a radio coverage area covered by a base radio station 2 connected to a switching system 3. The portable telephones 1 include originating-and-receiving portable telephones 1A having ordinary telephone functions capable of originating a call and of receiving a call, and origination-only portable telephone 1B capable of only originating a call. The switching system 3 includes a line connection control unit 8, as a call connecting function, for controlling an operation to connect a line of the base radio station 2 and a public network 9; an accounting unit 4, as an ordinary accounting function, to charge a call made by the portable telephone 1 identified by a terminal identification number assigned thereto according to the location of the called party; and an accounting data storage unit 5 which stores a charge determined by accounting at the completion of a call. A public network 9, connected to the switching system 3 accepts an originating request from the switching system 3, and calls an optional subscriber connected to the public network 9.

In the first embodiment, the switching system 3 has, in addition to the ordinary accounting function, an origination-only accounting control unit 6, as a origination-only portable telephone managing function, to monitor the number of message units used by the origination-only portable telephone 1B identified by the terminal identification number and to deny the origination of a call by the origination-only portable telephone 1B upon the increase of the number of message units to a predetermined number. The origination-only accounting control unit 6 accepts the origination of a call made by the origination-only portable telephone 1B when a prescribed input for the origination-only portable telephone 1B is given thereto by a system operator by operating a predetermined terminal device 7, or the like. The prescribed input may be used after the last origination of a call with sufficient message units by the origination-only portable telephone 1B has been made. Thus, the origination-only portable telephone 1B can be controlled by the switching system 3 of an ordinary portable telephone system when the functions of the switching system 3 are modified. The security of the portable telephone system is improved remarkably because the origination-only portable telephone 1B need not manage the number of message units where the switching system 3 does so.

Figure 2:
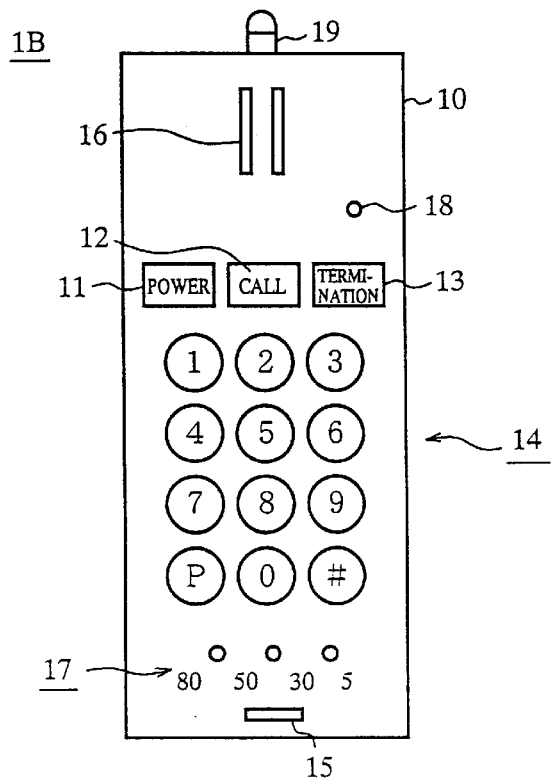
FIG. 2 is a plan view of a origination-only portable telephone employed in the portable telephone system of FIG. 1.

As shown in FIG. 2, the origination-only portable telephone 1B employed in the portable telephone system in the first embodiment has a case 10 of a size that enables the case 10 to be held by one hand, having a control panel provided with a power key 11, a talk key 12, a termination key 13, operating keys 14 including numeric keys for numerals 0 to 9, function keys for sharp (#) and programming (P), a microphone 15, a speaker 16, a residual message unit indicator 17, and a power/call permission indicator 18. The origination-only portable telephone 1B is provided with an antenna 19. A battery is contained in the case 10 so that the battery cannot be changed by the user. The origination-only portable telephone 1B, as compared with the originating-and-receiving portable telephone 1A, is simple in configuration; that is, a liquid crystal display, a call signal generator, a memory unit for storing telephone numbers and such, a sound volume controller, a clock, an alarm and a connector are omitted from the origination-only portable telephone 1B. Therefore, the origination-only portable telephone 1B has a relatively small number of parts, and is small, lightweight and inexpensive.

Figure 3:
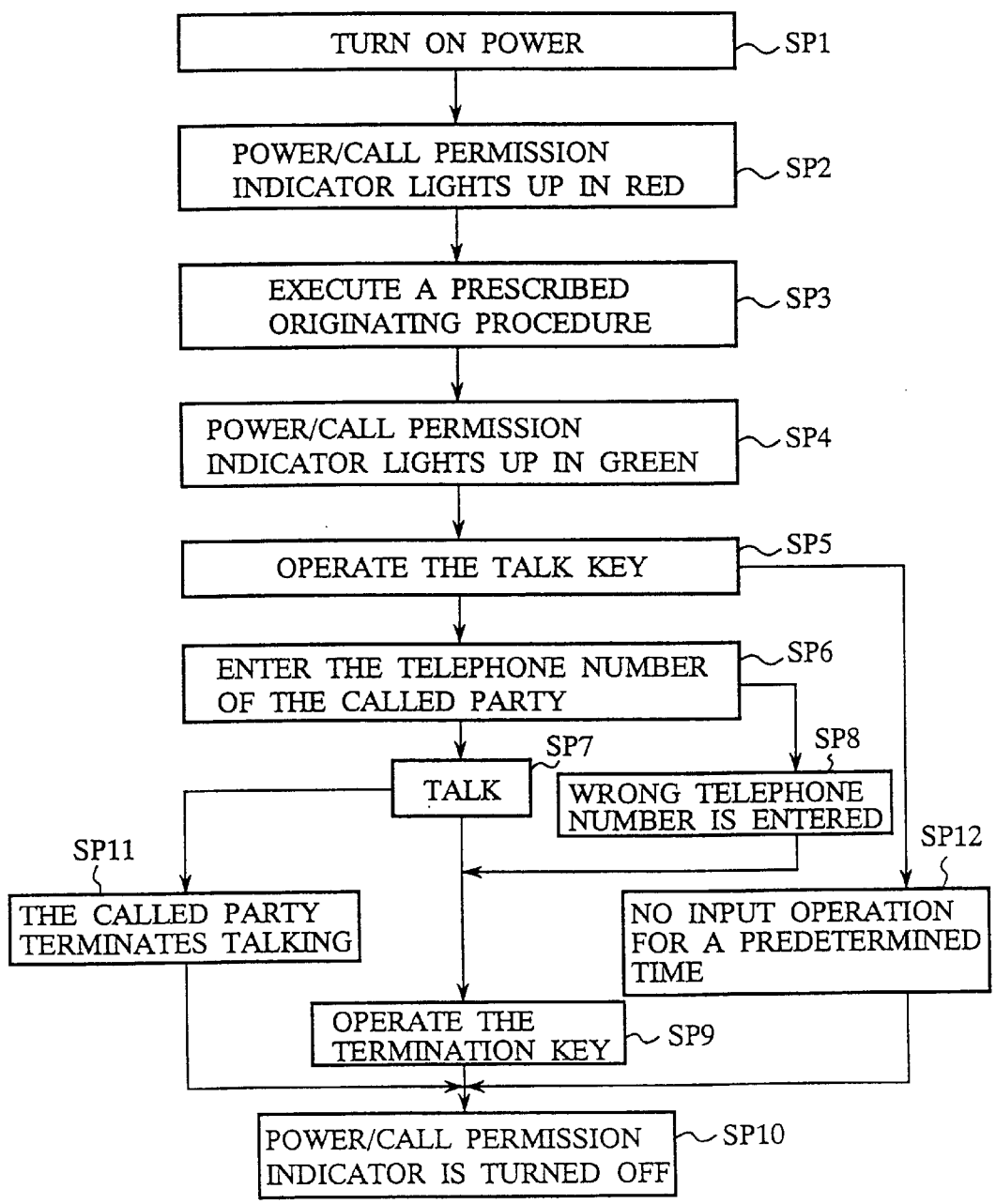
FIG. 3 is a flow chart of a procedure for operating the origination-only portable telephone employed in the portable telephone system of FIG. 1.

Referring to FIG. 3, when the power key 11 is operated to connect the origination-only portable telephone 1B to the power supply in step SP1, the power/call permission indicator 18 lights up, for example, in red in step SP2. Then, the origination-only portable telephone 1B is operated to carry out a prescribed originating procedure including, for example, a position registering operation to inform the base radio station 2 of the position of the origination-only portable telephone 1B in step SP3. Then, the power/call permission indicator 18 lights up in green in step SP4. Then, the user operates the talk key 12 in step SP5, operates the numeric keys 14 to enter the telephone number of the called party in step SP6, and starts taking in step SP7 after the origination-only portable telephone 1B has been connected to the called party. Step SP6 in which the numeric keys 14 is operated to enter the telephone number may be executed before step SP5 in which the talk key 12 is operated.

When talking in step SP7 has ended or if it is decided in step SP8 that the telephone number entered in step SP6 is wrong, the termination key 13 is operated in step SP9 to disconnect the origination-only portable telephone 1B from the power supply. Consequently, the power/call permission indicator 18 is turned off in step SP10. If the called party terminates talking in step SP11 during talk in step SP7, the origination-only portable telephone 1B is disconnected automatically from the power supply, and the power/talk permission indicator 18 is turned off accordingly in step SP10. If it is decided in step SP12 that any input operation is not executed for a predetermined time after the execution of step SP5 or SP6, the origination-only portable telephone 1B is disconnected automatically from the power supply and the power/talk permission indicator 18 is turned off in step SP10. Since the origination-only portable telephone 1B does not need any standby mode and is connected to the power supply only when the origination-only portable telephone 1B is used for talking, the consumption of the battery is reduced to secure the life of the battery as necessary for a predetermined number of message units.

The battery can be changed and the origination-only portable telephone 1B recycled only by the operator of the portable telephone system or an authorized person. Therefore, the case 10 of the origination-only portable telephone 1B is a sealed case, and is internally provided with an unsealing preventing mechanism which, for example, makes the reclamation of the internal circuit of the origination-only portable telephone 1B impossible if the case 10 is unsealed without entering a password. Thus, the dishonest change of the terminal identification number can be prevented.

FIG. 4(A) shows operations for calling the called party through the base radio station 2, the switching system 3 and the public network 9 when the portable telephone 1 starts an operation for talking in step SP7. Referring to FIG. 4(A), when the calling party operates the portable telephone 1 to enter the telephone number of the called party, the portable telephone 1 transmits an identification number assigned to the calling party together with the telephone number through the base radio station 2 to the switching system 3 (ST1). The switching system 3 retrieves and examines accounting information about the identification number of the calling party to see if there is residual message units. If there is residual message units, the switching system 3 calls the called party through the public network 9. (ST2).

When the called party responds to the call, the switching system 3 sends a signal to that effect to the portable telephone 1 (ST3), connects the lines, sets the lines in a busy state, and starts counting the number of message units (ST4). If the calling party terminates the call during communication, the portable telephone 1 informs the switching system 3 through the base radio station 2 of the termination of the call (ST5). Then, the switching system 3 instructs the called party through the public network 9 to disconnect the line, stop counting the number of message units (ST6), and inform the portable telephone 1 of the number of residual message units (ST7). As shown in FIG. 4(B), when the portable telephone 1 is operated for originating a call (ST1), the switching system 3 examines the accounting information identified by the identification number and denies the call originating operation of the calling party if the number of message units is zero (ST8).

Figure 5:
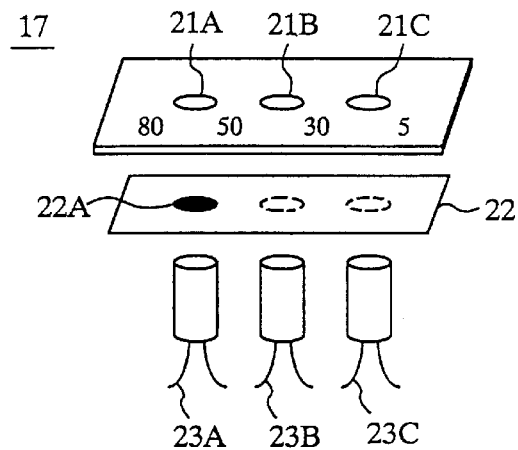
FIG. 5 is a schematic perspective view of a residual message unit display included in the origination-only portable telephone of FIG. 2.

Thus, the portable telephone system makes the switching system 3 transfer data representing the number of residual message units through the base radio station 2 upon the termination of the call. The number of residual message units is indicated by the residual message unit indicator 17 on the origination-only portable telephone 1B. As shown in FIG. 5, the residual message unit indicator 17 is formed by disposing three small heating elements 20A, 20B and 20C at positions respectively corresponding to openings 21A, 21B and 21C formed between numerals 80 and 50, between numerals 50 and 30, between numerals 30 and 5 indicating the numbers of residual message units, and covering the small heating elements 20A, 20B and 20C with a thermosensible sheet 22. A current is supplied to the small heating element corresponding to the number of residual message units represented by the data on the number of residual message units, for example, the heating element 20A, to heat a portion 22A of the thermosensible sheet 22 corresponding to the heating element 20A. Consequently, the portion 22A turns black. Since the portion 22A remains black, power is not wasted and the life of the battery is extended accordingly.

The origination-only portable telephone 1B capable of making only calls of a contract number of message units, such as 100 message units, is available from a station stall or a convenience store. Since the origination-only portable telephone 1B is capable only of originating a call, any contract procedures necessary for using ordinary portable telephones are not necessary at all for using the origination-only portable telephone 1B. The user needs only to buy the origination-only portable telephone 1B and use it. After originating calls for the predetermined number of message units, the origination-only portable telephone 1B is returned to the store where the origination-only portable telephone 1B was procured or to the operator of the system. The operator of the system unseals the origination-only portable telephone 1B by a predetermined procedure, replaces the battery with a new one, and operates the terminal device 7 to enter data instructing the switching system 3 to accept the call of a predetermined number of message units made by the origination-only portable telephone 1B identified by the terminal identification number.

When the portable telephone makes a call, the switching system counts the number of message units used by the portable telephone identified by the terminal identification number. The switching system denies the call origination of the origination-only portable telephone identified by the terminal identification number after the predetermined number of message units have been used. If a predetermined input is given to the switching system, the switching system accepts the call origination of the origination-only portable telephone. Thus, the origination-only portable telephone can be formed in a small, lightweight construction, and the security of the portable telephone system is improved remarkably.

Although only the system operator or an authorized person are allowed to change the battery in the foregoing first embodiment, the battery may be changed by the user. If the user is allowed to change the battery, the battery is changed by the user if the origination-only portable telephone is left unused for a long time and the battery has exhausted due to natural discharge, and the origination-only portable telephone can be used until all the contract message units are used.

Second Embodiment

Figure 6:
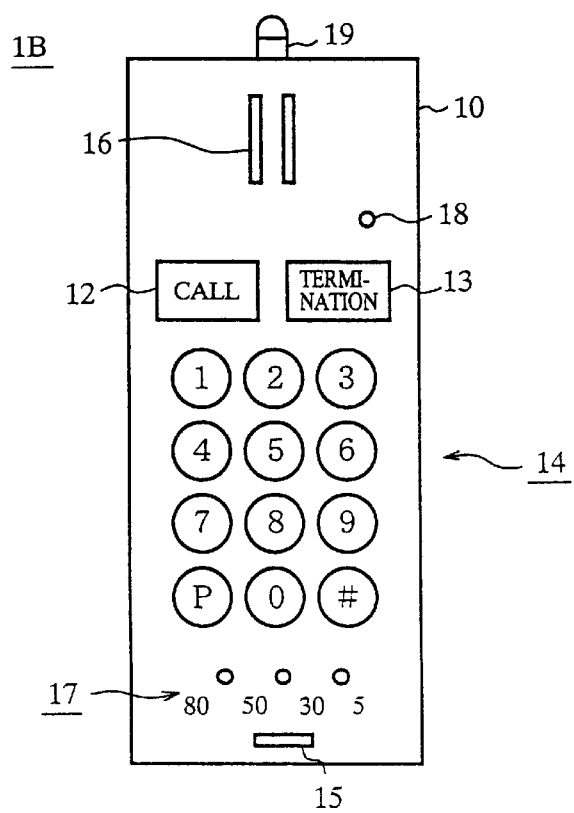
FIG. 6 is a plan view of a origination-only portable telephone in a second embodiment according to the present invention employed in the portable telephone system of FIG. 1.

An origination-only portable telephone 1B in a second embodiment according to the present invention to be used in the portable telephone system of the present invention is shown in FIG. 6, in which parts like or corresponding to those shown in FIG. 2 are designated by the same reference characters. The origination-only portable telephone 1B shown in FIG. 6 is not provided with any key corresponding to the power key 11 of the origination-only portable telephone 1B shown in FIG. 2. Therefore, the origination-only portable telephone 1B in the second embodiment has a simple control panel, needs a reduced number of parts, and is small, lightweight and inexpensive. Practically, the origination-only portable telephone 1B of FIG. 6 is connected to a power supply by depressing one of the numeric keys 14 thereof, and is operated by the operating procedure comprising the steps previously described with reference to FIG. 3 for a telephone call.

Third Embodiment

Figure 7:
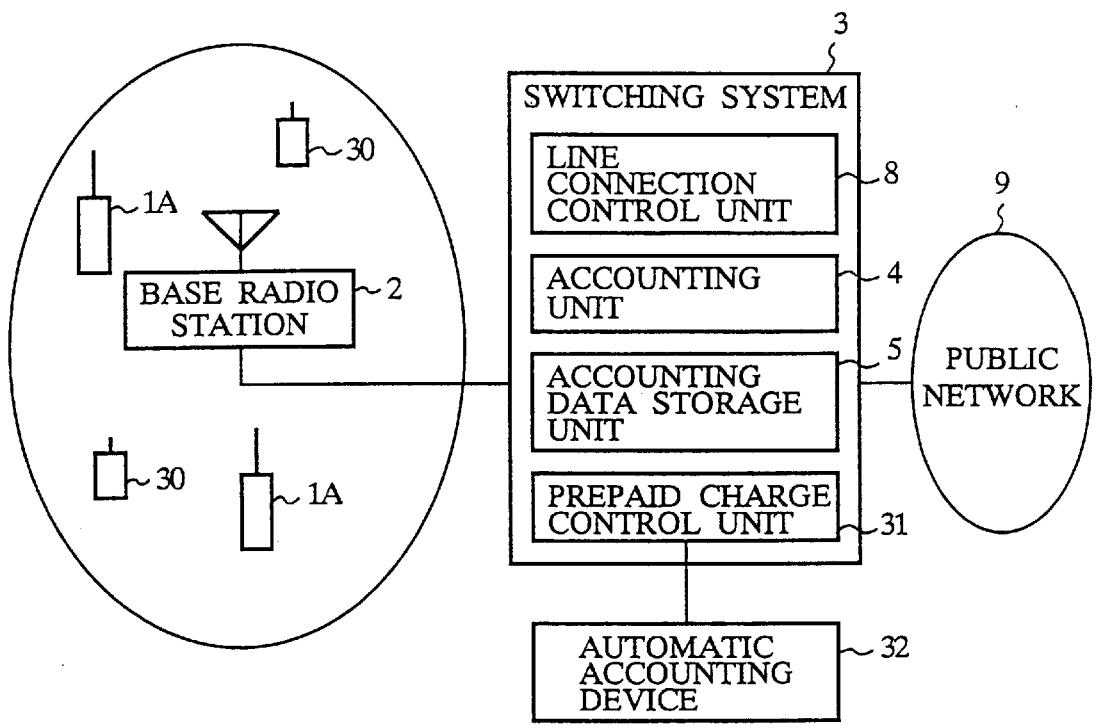
FIG. 7 is a block diagram of a portable telephone system in a third embodiment according to the present invention.

A portable telephone system in a third embodiment according to the present invention is shown in FIG. 7, in which parts like or corresponding to those previously described with reference to FIG. 1 are designated by the same reference characters. The portable telephone system shown in FIG. 7 employs, instead of the origination-only portable telephones 1B shown in FIG. 1, ordinary originating-and-receiving portable telephones 1A having an accounting function and prepaid type portable telephones 30 which can make calls of a predetermined number of message units corresponding to a prepaid amount of money. The originating-and-receiving portable telephones 1A and the prepaid type portable telephones 30 move around in a radio coverage area covered by a base radio station 2. A switching system 3 is provided with a prepaid charge control unit 31 instead of the origination-only accounting control unit 6 of FIG. 1.

The prepaid charge control unit 31 monitors the number of message units used by the prepaid type portable telephone 30 identified by a terminal identification number with reference to the contents of an accounting data storage unit 5, The prepaid charge control unit 31 denies the call origination of the prepaid type portable telephone 30 identified by the terminal identification number. When a call for the prepaid type portable telephone 30 occurs, gives a call-not-accepted signal to the calling party if the predetermined number of message units allowed to the prepaid type portable telephone 30 have been used. An automatic accounting device 32 is connected to the prepaid charge control unit 31. The contents of a storage location in the accounting data storage unit 5 corresponding to data representing the terminal identification number and a charge and provided by the automatic accounting device 32 are updated, and a number of message units is set according to a charge for the terminal identification number. Consequently, the prepaid type portable telephone 30 identified by an updated terminal identification number can be used for call originating and call receiving operations.

Figure 8:
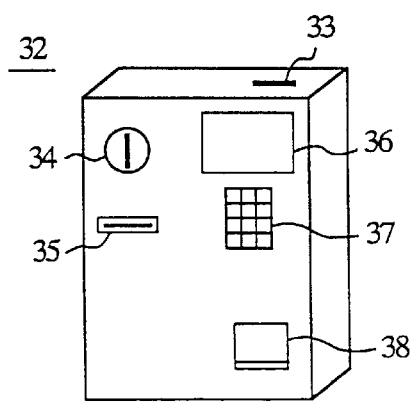
FIG. 8 is a schematic perspective view of an automatic accounting device included in the portable telephone system of FIG. 7.

Referring to FIG. 8, the automatic accounting device 32 is provided in its upper end wall with an opening 33 for receiving the prepaid type portable telephone 30. A connector which mates with a connector, not shown, disposed on the bottom wall of the prepaid type portable telephone 30 is disposed in the opening 33. When the prepaid type portable telephone 30 is inserted in the opening 33, the terminal identification number stored in the ROM of the prepaid type portable telephone 30 is read automatically. The automatic accounting device 32 is provided on its front panel with a coin slot 34, a card slot 35, a liquid crystal display 36, a keyboard 37 and a change return pocket 38. When a predetermined amount of money is deposited through the coin slot 34 into the automatic accounting device 32, the automatic accounting device 32 sends data representing the amount of the prepaid money and the terminal identification number to the prepaid charge control unit 31. If the prepaid type portable telephone 30 is inserted in the opening 33 and a credit card is inserted in the card slot 35, a message requesting an operation of a keyboard to enter a password number is displayed on the liquid crystal display 36. When the password number is entered, the automatic accounting device 32 sends the card number and the password number to, for example, a card management center, not shown, to request acceptance. When the card management center gives an acceptance, the automatic accounting device 32 sends data representing a predetermined amount of money as prepaid charge and the terminal identification number to the prepaid charge control unit 31.

In the third embodiment, the switching system counts the number of message units used by the prepaid type portable telephone when the prepaid type portable telephone identified by the terminal identification number makes a call, denies call origination and call reception by the prepaid type portable telephone after the predetermined number of message units have been used and, if a predetermined input is given by the automatic accounting device, accepts the call origination and the call reception of the prepaid type portable telephone. Thus, the security of the portable telephone system is improved remarkably.

Although the portable telephone system in the third embodiment sends the terminal identification number and the prepaid amount of money simply to the prepaid charge control unit 31, the security of the portable telephone system will further be improved if the prepaid amount of money and the terminal identification number are encrypted into corresponding codes by a predetermined encrypting procedure and the codes are sent to the prepaid charge control unit 31. In the second embodiment, a prepaid amount of money is paid by either depositing cash in the automatic accounting device 32 or inserting a credit card in the automatic accounting device 32. However, the automatic accounting device 32 may be designed to accept payment by only cash or only a credit card or the automatic accounting device 32 may be designed to accept payment by a prepaid card. Although the foregoing portable telephone system requires payment of a predetermined amount of money in cash or by a credit card, the portable telephone system may be designed to accept payment of any amount of money determined by the user. The accessibility of the automatic accounting device 32 will be further improved if a prepaying procedure is carried out on an interactive basis by using information displayed on the liquid crystal display 36.

In the third embodiment, a connector is disposed in the opening 33 of the automatic accounting device 32, the respective internal circuits of the prepaid type portable telephone 30 and the automatic accounting device 32 are connected electrically when the prepaid type portable telephone 30 is inserted in the opening 33, and the automatic accounting device 32 executes the automatic accounting procedure. However, the automatic accounting device 32 may be provided with a magnetically shielded recessed pocket, and the automatic accounting procedure may be carried out by putting the prepaid type portable telephone 30 into the magnetically shielded pocket, closing the magnetically shielded pocket with a shielding cover and connecting the respective internal circuits of the prepaid type portable telephone 30 and the automatic accounting device 32 by radio. Such an automatic accounting procedure reduces mechanical connections, improves the accessibility of the automatic accounting device 32, and improves the durability and the confidence of the automatic accounting device 32.

Fourth Embodiment

Figure 9:
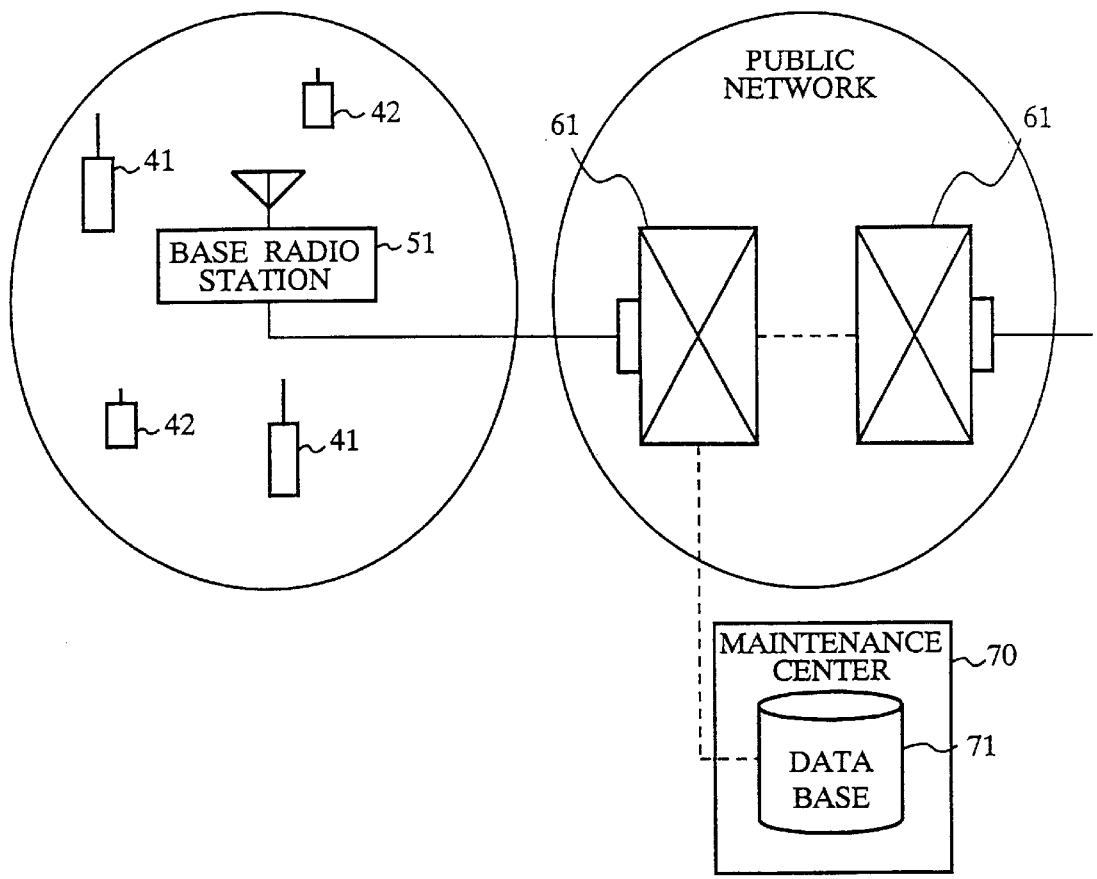
FIG. 9 is diagrammatic view of a portable telephone system in a fourth embodiment according to the present invention.
Figure 10:
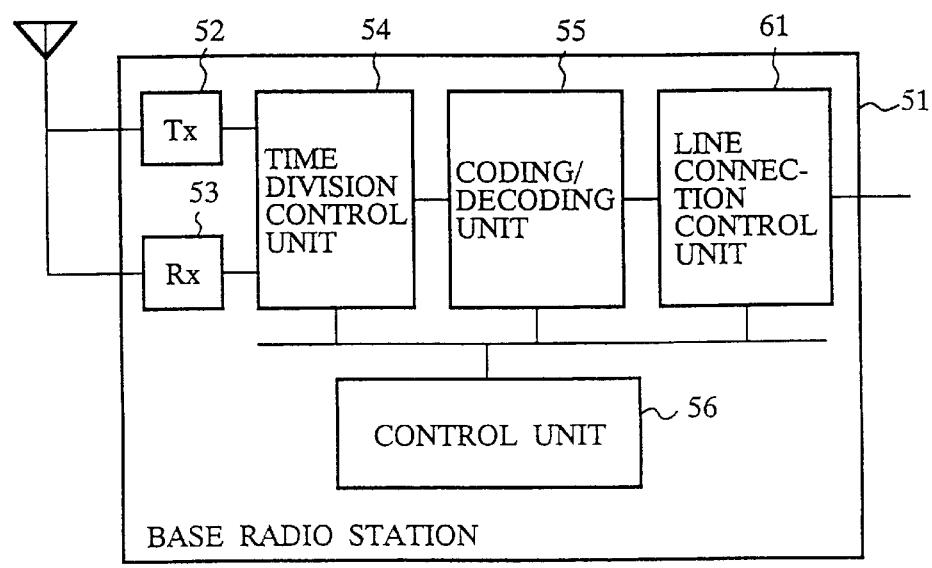
FIG. 10 is a block diagram of a base radio station included in the portable telephone system in the fourth embodiment according to the present invention.

FIG. 9 is diagrammatic view of a portable telephone system in a fourth embodiment according to the present invention and FIG. 10 is a block diagram of a base radio station included in the portable telephone system of FIG. 9 in the fourth embodiment accoring to the present invention. Practically, the portable telephone system in the fourth embodiment is supposed to be a PHS (personal handyphone system). Referring to FIGS. 9 and 10, simple portable telephones 41 move around in a radio coverage area covered by a base radio station 51. The portable telephone system includes an accounting system and a prepaid charge system. The accounting system counts the number of used message units (accounting information) stored in a data base 71 kept in a maintenance center 70, converts the number of used message units used in a predetermined period into a corresponding amount of money and bills the user for a charge. Prepaid type simple portable telephones 42 move around in the radio coverage area covered by the base radio station 51. The prepaid charge system subtracts the number of used message units for the distance between the prepaid type portable telephone 42 and the called party from the number of residual message units (residual charge information). The prepaid charge system allows the use of the prepaid type simple portable telephone 42 until all the message units corresponding to the amount of the prepaid money are used. Whereas the use of the simple portable telephone 41 needs to make a contract with a relevant common carrier, the prepaid type simple portable telephone 42 does not need to make any contract with any common carrier. The prepaid type simple portable telephone 42 can be procured from a station stall, a portable telephone bending machine.

A base radio station 51 discriminates between the simple portable telephone 41 and the prepaid type simple portable telephone 42 and carries out a prescribed accounting procedure for the portable telephone which originated a call, i.e., the simple portable telephone 41 or the prepaid type simple portable telephone 42. A line connection control unit 61 connects the lines of the base radio station 51 to a public network. Terminal authentication information authenticating the simple portable telephones 41 and the prepaid type simple portable telephones 42, accounting information (accounting information for the simple portable telephones 41 and residual charge information for the prepaid type simple portable telephones 42), position information, security information and such are stored in the data base 71 kept in the maintenance center 70.

A transmitter 52 and a receiver 53 serve as radio interfaces between the portable telephones and the base radio station 51. A time division control unit 54 carries out what is called a TDMA/TDD procedure (time division multiple access/time division duplex procedure) to allocate communication channels to time slots included in radio channels, and to assemble and disassemble radio frames for a control channel and communication channel. A coding/decoding unit 55 carries out an ADPCM procedure (adaptive differential PCM procedure) to convert ADPCM signals of 32 kbit/s used in a radio section for the simple portable telephones 41 and the prepaid type simple portable telephones 42 and µ-low PCM signals of 64 kbit/s used by an NTT digital network.

A control unit 56 includes a CPU and a storage device, and communicates with the maintenance center 70 through special lines to carry out operations for position registration, authentication, call connection and account control. In the fourth embodiment, control unit 56 determines whether the portable telephone which originated a call is the simple portable telephone 41 or the prepaid type simple portable telephone 42, and controls an accounting system for the portable telephone which originated a call. If the portable telephone which originated a call is identified as the simple portable telephone 41, the control unit 56 manages only service time and the called party and gives information about service time and the called party to the maintenance center 70 upon the termination of the call. If the portable telephone which originated a call is identified as the prepaid type of simple portable telephone 42, the control unit 56 controls, in addition to service time and the called party, information about the residual charge for the prepaid type of simple portable telephone 42. Thus, the control unit retrieves the above information from the data base 71 of the maintenance center 70, according to the service time and the called party.

The operation of the portable telephone system in the fourth embodiment according to the present invention will be described hereinafter.

FIG. 11 is a time chart of assistance in explaining a called party calling procedure to be carried out by the portable telephone system in the fourth embodiment according to the present invention. A called party calling procedure to be carried out when the simple portable telephone 41 originates a call is a known procedure and hence the description thereof will be omitted.

When the telephone number of a called party is entered by operating the prepaid type simple portable telephone 42, the prepaid type simple portable telephone 42 sends the telephone number of the called party and the ID number of the calling party to the base radio station 51 in step ST1. Upon the reception of the telephone number of the called party and the ID number of the calling party, the base radio station 51 examines the ID number of the calling party in step ST2 to determine whether or not the portable telephone originated a call is the prepaid type simple portable telephone 42 having a prepaid charge system.

If the portable telephone which originated a call is identified as the prepaid type simple portable telephone 42, the base radio station 51 sends a user's residual charge information request signal to the data base 71 in step ST3, and examines the user's residual charge information based on a user's residual charge response signal from the data base 71 in step ST4 to see if there are any residual message units in step ST5. If there are some residual message units, the base radio station 51 calls the called party through the line connection control unit 61 of the public network in step ST6. When the called party answers the call, the line connection control unit 61 of the public network informs the calling party that the called party has answered through the base radio station 51 in step ST7. Then, the base radio station 51 starts counting the residual message units of the calling party during conversation in step ST8 and connect the line through the line connection control unit 61 of the public network in step ST9.

The base radio station 51 checks the residual message units of the calling party during conversation in step ST10, gives a residual message unit depletion alarm, such as a background music. The residual message unit indicates a predetermined number of residual message units to the calling party in step ST11. The base radio station 51 disconnects the line upon the depletion of the residual message units. If the prepaid simple portable telephone 42 has only a few residual message units, it is possible that the line is disconnected before conversations are completed. Therefore, the prepaid simple portable telephone 42 will not be used until all the residual message units are depleted and hence the reduction of prepaid type portable telephone recovery percentage can be prevented.

The connection may be extended for a period within a fixed service message units, such as service message units equivalent to one minute during which a background music or the like is inserted, when the residual message units have been depleted during conversation. In addition further origination of a call may be denied even if there are residual service message unit after the completion of conversations.

If the call is terminated before the residual message units are depleted in step ST12, the base radio station 51 disconnects the communication lines in step ST13, ends an operation to count the residual message unit of the calling party in step ST14, informs the calling party and the data base 71 of the number of residual message units in step ST15. The information of the calling party of the number of residual message units is not necessarily necessary. If the prepaid simple portable telephone 42 moves during the call, the base radio station 51 managing the communication control changes and hence service time, information about the called party and information about the residual message units are transmitted to the base radio station 51 to which the management has been handed over.

The number of residual message units can be changed to a number of residual message units equivalent to a prepaid amount of money paid for the prepaid type simple portable telephone 42 by operating the automatic accounting device 32 shown in FIG. 8. When the number of residual message units is thus rewritten, the number of residual message units stored in the data base 71 is rewritten accordingly by radio through the line connection control unit 61 of the public network. At the same time, a complicated accounting procedure which is currently carried out on the basis of service time, the distance between the calling party and the called party and contract service by the simple portable telephone 41 can be achieved by, for example, a simple accounting procedure requiring only several steps of weighting by the addition of such a service.

Fifth Embodiment

Figure 12A:
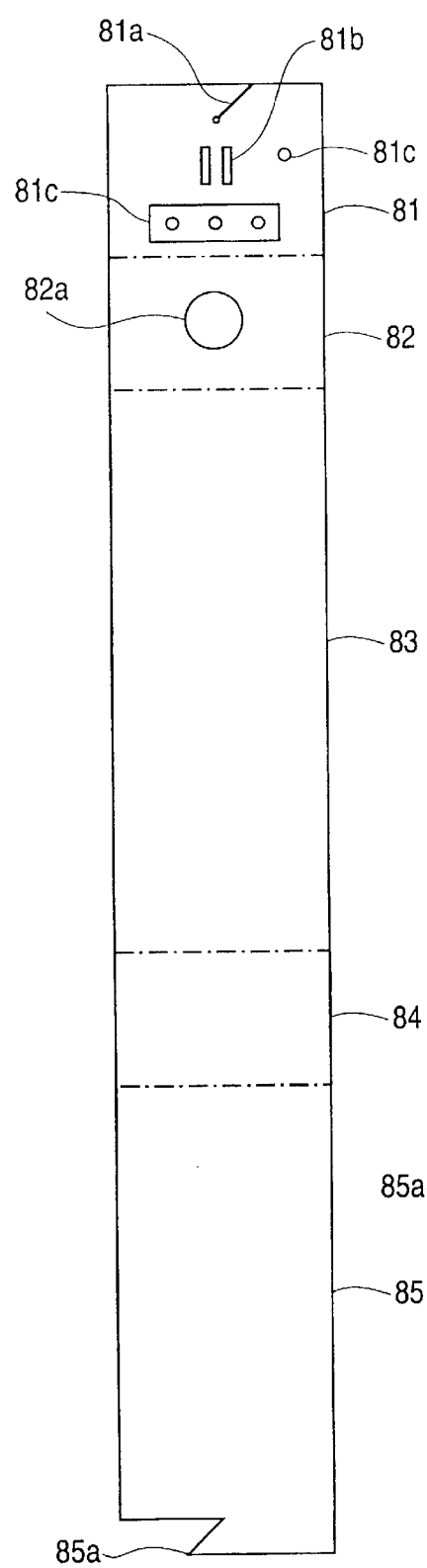
FIG. 12 are a development and a perspective view, respectively, of a folding simple case formed by folding a cardboard, employed in the portable telephone system in the fifth embodiment according to the present invention.
Figure 12B:
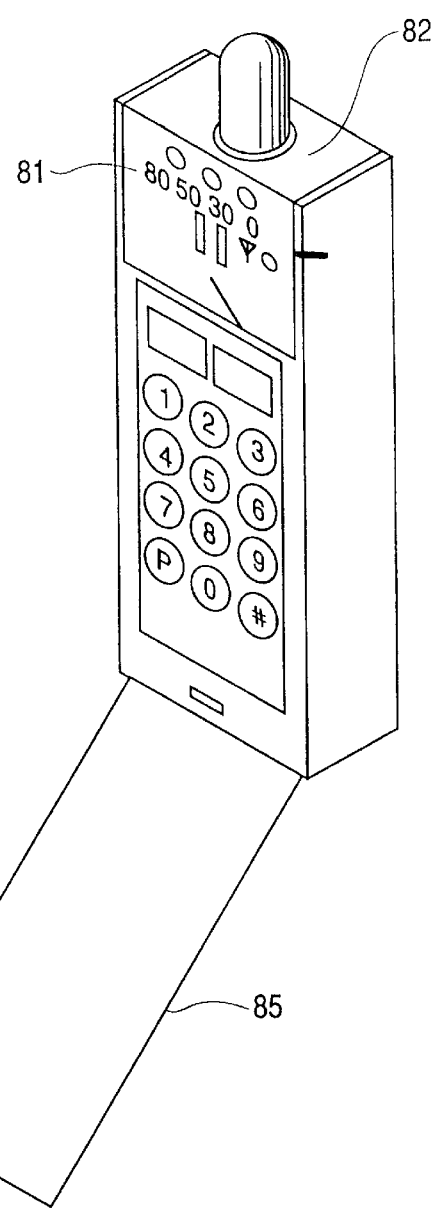

A simple folding case formed by folding a cardboard, employed in a portable telephone system in a fifth embodiment according to the present invention is shown in FIGS. 12(a) and 12(b), in which parts like or corresponding to those of the fourth embodiment are designated by the same reference characters and the description thereof will be omitted. FIG. 12(a) is a development of the simple folding case, and FIG. 12(b) is a perspective view of the simple folding case containing a prepaid type simple portable telephone 42. In FIG. 12(a), long and short dash lines are inside folding lines. The case has an upper front section 81 provided with a slit 81a, a speaker grille 81b and an opening 81c through which a LED of the prepaid type simple portable telephone 42 is exposed, and covering an upper portion of the front surface of the prepaid type simple portable telephone 42, a top section 82 provided with an opening 82a through which the antenna of the prepaid type simple portable telephone 42 is projected, and covering the upper end surface of the prepaid type simple portable telephone 42, a back section 83 covering the back surface of the prepaid type simple portable telephone 42, a bottom section 84 for covering the bottom surface of the prepaid type simple portable telephone 42, and a flip section 85 provided with a tuck 85a and covering a lower portion of the front surface of the prepaid type simple portable telephone 42. The tuck 85a is inserted in the slit 81a to cover the front surface of the prepaid type simple portable telephone 42 with the flip section 85 to prevent the erroneous operation of the prepaid type simple portable telephone 42.

Another simple folding case employed in the portable telephone system in the fifth embodiment according to the present invention is shown in FIGS. 13(a) and 13(b). FIG. 13(a) is a development of the simple folding case, and FIG. 13(b) is a perspective view of the simple folding case containing a prepaid type simple portable telephone 42. In FIG. 13(a), alternate long and short dash lines are inside folding lines, and broken lines are outside folding lines. The folding case has bottom sections 91-1 and 91-2 forming a double bottom wall and covering the bottom surface and portions of the side surfaces of the prepaid type simple portable telephone 42, flip sections 92-1 and 92-2 forming a double flip and covering the front surface of the prepaid type simple portable telephone 42 to prevent the erroneous operation of the prepaid type simple portable telephone 42, a snap stud 92a formed on the flip section 92-2, a front section 93 provided with a microphone grille 93a, and opening 93b in which the operating keys of the prepaid type simple portable telephone 42 are arranged and a snap socket 93c in which the snap stud 92a fits, and covering the front surface and the side surfaces of the prepaid type simple portable telephone 42, an top section 94 provided with an opening through which the antenna of the prepaid type simple portable telephone 42 projects, and covering the upper surface of the prepaid type simple portable telephone 42, and a back section 95 covering the back surface and the side surfaces of the prepaid type simple portable telephone 42. When encasing the prepaid type simple portable telephone 42 in the case, the prepaid type simple portable telephone 42 is placed on the back section 95 of the unfolded case, and then the sections are folded along the folding lines.

Figure 14A:
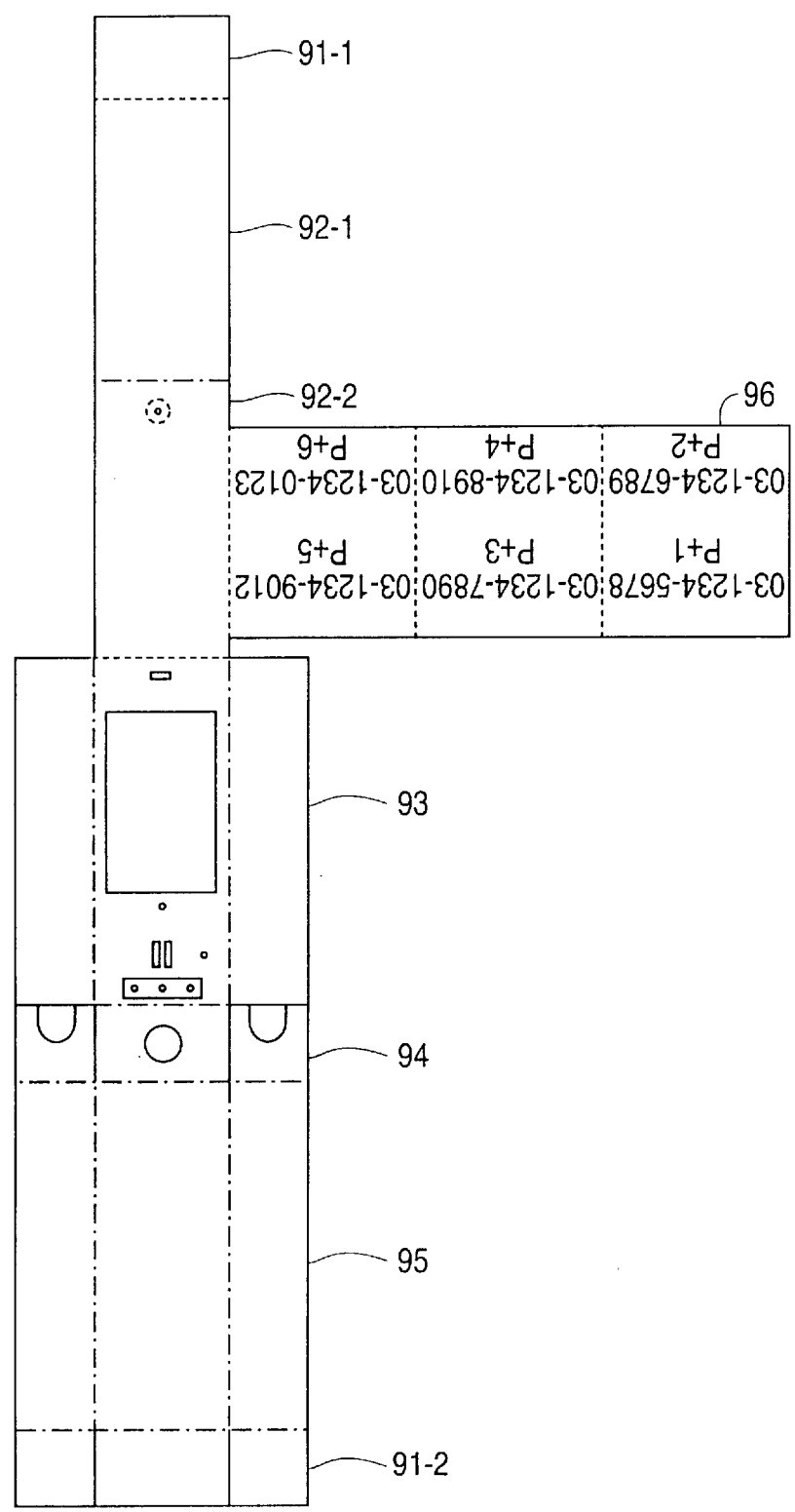
FIG. 14 are a development and a perspective view, respectively, of a third folding simple case employed in the portable telephone system in the fifth embodiment according to the present invention.
Figure 14B:
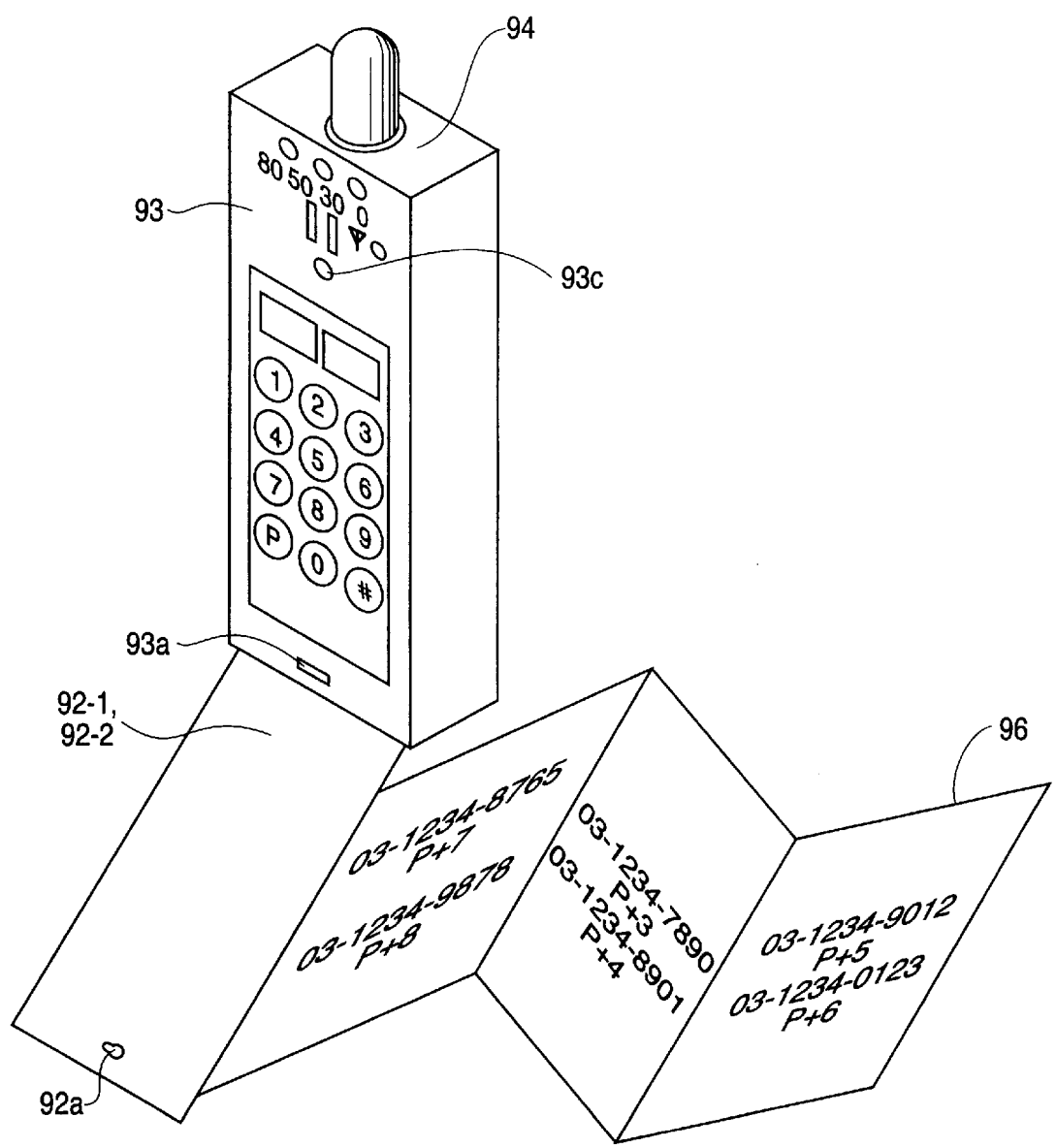

A third simple folding case employed in the portable telephone system in the fifth embodiment according to the present invention is shown in FIGS. 14(a) and 14(b). FIG. 14(a) is a development of the simple folding case, and FIG. 14(b) is a perspective view of the simple folding case containing a prepaid type simple portable telephone 42. In FIG. 14(a), alternate long and short dash lines are inside folding lines, and broken lines are outside folding lines. This folding case is formed by adding an advertising section 96 to one side edge of the flip 92-2 of FIG. 13. Advertisements, such as those of shops, are printed on the inner surface of the advertising section 96. Therefore, a prepaid type simple portable telephone 42 encased in this folding case is suitable for use as a present.

A fourth simple folding case employed in the portable telephone system in the fifth embodiment according to the present invention is shown in FIGS. 15(a), 15(b) and 15(c). FIG. 15(a) is a development of the simple folding case, FIG. 15(b) is a perspective view of the simple folding case containing a prepaid type simple portable telephone 42 and FIG. 15(c) is a perspective view of the simple folding case and the prepaid type simple portable telephone 42 half pulled out of the simple folding case for use. In FIG. 15(a), alternate long and short dash lines are inside folding lines, and broken lines are outside folding lines. A covering portion 100 protects the prepaid type simple portable telephone 42, and a sliding portion 110 serves as a cover to prevent the erroneous operation of the prepaid type simple portable telephone 42 while the prepaid type simple portable telephone 42 is not used and is pulled off when the prepaid type simple portable telephone 42 is used. An upper front section 101 covers an upper portion of the front surface of the prepaid type simple portable telephone 42, an upper section 102 is provided with an opening 102a through which an antenna is projected and covers the top surface of the prepaid type simple portable telephone 42, side sections 103 for covering the side surfaces of the prepaid type simple portable telephone 42, a back section 104 covering the back surface of the prepaid type simple portable telephone 42, a lower front section 105 is provided with microphone grille 105a and covers the lower portion of the front surface of the prepaid type simple portable telephone 42, and an elastic connector 106 having one end attached to a lower portion of the back section 104 and the other end attached to a lower portion of the back section 104 of the sliding portion 110. A bottom section 107 covers the bottom surface of the prepaid type simple portable telephone 42.

INDUSTRIAL APPLICABILITY

As is apparent from the foregoing description, the portable telephone system in accordance with the present invention is suitable for use as a portable telephone system using portable telephones moving in a radio coverage area covered by a base radio station connected to a switching system and including origination-only portable telephones capable of only originating a call through the base radio station.

The portable telephone system in accordance with the present invention is suitable for use as a portable telephone system including a base radio station connected through a line connection control unit to a public network, portable telephones moving in a radio coverage area covered by the base radio station and capable of achieving communication through the base radio station, and a data base connected to the base radio station and managing data about the portable telephones.

What is claimed is:

1. A wireless telephone system including:
   a switching system, a base radio station connected to the switching system, and portable telephones in a radio coverage area covered by the base radio station and including origination-only portable telephones capable of only originating a call through the base radio station;
   said switching system comprising:
      an accounting means for counting the number of message units used by each of the origination-only portable telephones each identified by terminal identifying information; and
      an origination-only accounting control means supporting a first access mode, a second access mode, and a third access mode, the first access mode denying the originating operation of the origination-only portable telephone when the number of message units used by the origination-only portable telephone identified by the terminal identifying information reaches a predetermined number of message units, the second access mode permitting the originating operation of the origination-only portable telephone identified by the terminal identifying information when a predetermined input operation is executed, and the third access mode providing an automatic extension of the communication for continuing the operation of the origination-only portable telephone, which starts before the number of message units of the origination-only portable telephone reaches zero.

2. The wireless telephone system according to claim 1, wherein the origination-only portable telephone includes a power switch that changes its state from off to on each time the origination-only portable telephone is used for originating a call to reduce power consumption during a wait state of the portable telephone.

3. The wireless telephone system according to claim 1, wherein the origination-only portable telephone has a control panel and numeric keys for entering telephone number information for a call arranged on the control panel, the numeric keys facilitating connection of the origination-only portable telephone to a power supply.

4. The wireless telephone system according to claim 2, wherein the origination-only portable telephone is provided with a power supply cut-off means which disconnects the origination-only portable telephone from the power supply when any input operation is not made in a predetermined time after the connection of the origination-only portable telephone to the power supply, or when termination of a call is detected.

5. The wireless telephone system according to claim 1, wherein the origination-only accounting control means included in the switching system sends data representing the cumulative number of message units to the origination-only portable telephone every termination of a call, and each origination-only portable telephone is provided on its control panel with a call information display means for displaying data representing the cumulative number of used message units every termination of said call.

6. The wireless telephone system according to claim 1, wherein the plurality of portable telephones include, in addition to those origination-only portable telephones, originating-and-receiving portable telephones, the accounting means of the switching system counts the numbers of message units used by the origination-only portable telephones and the originating-and-receiving portable telephones identified by terminal identifying information.

7. A portable telephone system including:
   a switching system, a base radio station connected to the switching system and portable telephone in a radio coverage area covered by the base radio station;
   said portable telephones including prepaid type portable telephones being allowed to originate calls until a predetermined number of message units are depleted, and
   said switching system comprising:
      an accounting means for counting the number of message units used by each of the prepaid type portable telephones each identified by terminal identifying information in addition to that of message units used by each of the ordinary portable telephones, and
      a prepaid charge control means supporting a first access mode, a second access mode, and a third access mode, the first access mode denying an originating operation and a receiving operation of each prepaid type portable telephone identified by the terminal identifying information when the number of message units used by the prepaid type portable telephone identified by the terminal identifying information reaches a predetermined number of message units, the second access mode permitting the originating operation and the receiving operation of the prepaid type portable telephone identified by the terminal identifying information upon the reception of the terminal identifying information identifying the prepaid type portable telephone, and accounting information, the third access mode providing an automatic extension of the communication for continuing the operation of the origination-only portable telephone, which starts before the number of message units of the origination-only portable telephone reaches zero.

8. The portable telephone system according to claim 7, further comprising an automatic accounting means including a terminal identifying information read means for reading terminal identifying information assigned to each of the prepaid type portable telephones, and money information input means for accepting money information, and capable of sending the accepted money information together with the read terminal identifying information to the prepaid charge control means.

9. The portable telephone system according to claim 8, wherein the automatic accounting means encrypts the terminal identifying information and the money information into corresponding codes by a predetermined encrypting procedure, and sends the codes to the prepaid charge control means.

10. A portable telephone system including: a base radio station connected through a line connection control unit to a public network; portable telephones moving in a radio coverage area covered by the base radio station and achieving communication through the base radio station; and a data base connected to the base radio station and managing data on each of the portable telephones;

said portable telephones include simple portable telephones each being associated with a charging system for counting the cumulative number of used message units for storage in the data base, the charging system converting the cumulative number of used message units at predetermined time intervals into a charge and charging the subscriber for the charge, and prepaid type simple portable telephones each being associated with a prepaid charge system for reading the number of residual prepaid message units from the data base, the prepaid charging system subtracting the number of used message units from the number of residual prepaid message units during a call, and said prepaid type simple portable telephones having access to prepaid communication service until all the prepaid message units corresponding to the prepaid amount of money are depleted, and said base radio station being capable of identifying the portable telephone which made a call as the simple portable telephone or the prepaid type simple portable telephone, and of executing a charging procedure according to a charging method for the portable telephone which made a call, at least one of the simple portable and the prepaid simple portable having a tamper-resistant housing for disabling circuitry inside the housing upon opening of the housing without entry of a correct password.

11. The portable telephone system according to claim 10, wherein the base radio station checks the number of residual message units during a call, sends alarm information to the calling party when the number of residual message units reaches a predetermined number, and disconnects the line forcibly upon the depletion of all the residual message units.

12. The portable telephone system according to claim 10, wherein the base radio station allows a fixed number of additional message units after depletion of the number of residual message units.

13. The portable telephone system according to claim 10, wherein the base radio station sends information about the time of call, a called party and a residual charge to a base radio station to which the control of the portable telephone is handed over due to the movement of the location of the portable telephone from the radio coverage area covered by the former base radio station to that covered by the latter base radio station.

14. The portable telephone system according to claim 10, wherein the prepaid type simple portable telephone is encased in a simple, folding case formed simply by folding a cardboard.

15. The portable telephone system according to claim 10, wherein the simple, folding case has a flip to prevent an erroneous operation.

16. The portable telephone system according to claim 15, wherein the flip has a folded advertising portion.

17. The portable telephone system according to claim 15, wherein the simple, folding case has a covering portion for protecting the prepaid type simple portable telephone, the prepaid type simple portable telephone is contained in the covering portion, and the prepaid type simple portable telephone is slid relative to the covering portion for an operation to make a call.

18. A wireless communications system comprising:
    a switching system, associated with a base station, the base station providing communications service to mobile stations in a radio coverage area,
    said switching system including a counter for counting the number of message units used by each of the mobile stations; and
    an accounting controller for supporting a first access mode, a second access mode, and a third access mode of the communications service to a particular one of the mobile stations, the first access mode denying an originating operation of the particular mobile station when the number of message units used by the particular mobile station meets or exceeds a predetermined threshold number of message units, the second access mode permitting the originating operation of the particular mobile station when the accounting controller accepts a predetermined input operation, the third access mode providing an automatic extension of the communication for continuing the operation of the origination-only portable telephone, which starts before the number of message units of the origination-only portable telephone reaches zero.

19. The communications system according to claim 18 wherein the particular mobile station is adapted to originate an outgoing call by communicating to the base station and wherein the particular mobile station is arranged to automatically switch power off to its circuitry when not originating or executing the outgoing call.

20. The communications system according to claim 18 wherein the particular mobile station further comprises a keypad and wherein the input operation comprises a code entered into the keypad.

21. The wireless telephone system according to claim 18, wherein the particular mobile station includes a keypad, a power supply and a power supply cut-off device for disconnecting the particular mobile station from the power supply unless a certain code is entered into the keypad.

22. The wireless telephone system according to claim 18, wherein the accounting controller sends data representing the cumulative number of message units to the mobile station after each termination of a call for display on the mobile station.

23. The wireless communications system according to claim 18, wherein the mobile stations include origination-only portable telephones and originating-and-receiving portable telephones, the counter adapted to count the numbers of message units used by the origination-only portable telephones, while ignoring the originating-and-receiving portable telephones identified by mobile identifiers.

24. The wireless communications system according to claim 18 further comprising a terminal device coupled to the accounting controller, the terminal device supporting entry of the input operation and transmitting the input operation to the accounting controller in an encrypted format.

25. The communications system according to claim 18 wherein the particular one of the mobile stations has a tamper-resistant housing for disabling circuitry of the particular one upon opening of the housing without entry of a correct password.

\* \* \* \* \*